(12) United States Patent
Yu et al.

(10) Patent No.: US 10,995,938 B2
(45) Date of Patent: May 4, 2021

(54) PANEL LAMP

(71) Applicant: NINGBO GANPE OPTOELECTRONICS CO., LTD., Ningbo (CN)

(72) Inventors: Xiangjun Yu, Ningbo (CN); Liu Yuan, Ningbo (CN)

( * ) Notice: Subject to any disclaimer, the term of this patent is extended or adjusted under 35 U.S.C. 154(b) by 0 days.

(21) Appl. No.: 16/883,822

(22) Filed: May 26, 2020

(65) Prior Publication Data

US 2021/0033265 A1 Feb. 4, 2021

(30) Foreign Application Priority Data

Aug. 1, 2019 (CN) .......................... 201910705107.9

(51) Int. Cl.
*F21V 17/10* (2006.01)
*F21V 8/00* (2006.01)
*F21V 1/14* (2006.01)

(52) U.S. Cl.
CPC ............ *F21V 17/104* (2013.01); *F21V 1/143* (2013.01); *G02B 6/0055* (2013.01)

(58) Field of Classification Search
CPC ...... F21V 17/104; F21V 1/143; G02B 6/0056
See application file for complete search history.

(56) References Cited

U.S. PATENT DOCUMENTS 5,040,098 A  *  8/1991  Tanaka ................ G09F 13/0409
                                                          362/634
2018/0306966 A1* 10/2018  Conrad ..................... F21K 9/61

* cited by examiner

*Primary Examiner* — Thomas M Sember
(74) *Attorney, Agent, or Firm* — W&K IP

(57) ABSTRACT

The present invention relates to the technical field of lighting fittings, in particular to a panel lamp. The panel lamp comprises a frame (1), a lamp panel (2), a light guide plate (3), a reflective sheet (9), a lampshade (4) and a rib (6) supporting the lampshade (4) wherein there is a clearance between the light guide plate (3) and the lampshade (4), which is good in irradiation effect and comfortable for users to use.

9 Claims, 2 Drawing Sheets

PANEL LAMP

CROSS-REFERENCE TO RELATED APPLICATIONS

This application claims priority to Chinese Patent Application No. 201910705107.9 with a filing date of Aug. 1, 2019. The content of the aforementioned applications, including any intervening amendments thereto, are incorporated herein by reference.

TECHNICAL FIELD

The present invention relates to the technical field of lighting fittings, in particular to a panel lamp.

BACKGROUND

As a lighting fitting, the panel lamp in the prior art has two light-emitting modes, that is, a direct-type light-emitting mode and a lateral-type light-emitting mode. In view of larger whole thickness of the panel lamp adopting the direct-type light-emitting mode, the panel lamp adopting the lateral-type light-emitting mode is required in some installation scenario.

The panel lamp adopting the lateral-type light-emitting mode comprises a frame, a lamp panel, a light guide plate, reflective sheet, a lampshade and a rib supporting the lampshade. In the prior art, there is a certain clearance between the light source on the lamp panel and the light guide plate so as to cause certain light leakage. In addition, the light guide plate clings to the lampshade, therefore, light leaked from the space between the light source on the lamp panel and the light guide plate directly emits out from the lateral sides of the lampshade, further causing a poor irradiation effect. To prevent the above problem, the rib in the prior art is widened, in this case, light leaked can be shielded, but a wider rib would bring poor use comfortableness to users.

SUMMARY

The technical problem to be settled by the present invention is to provide a panel lamp that is good in irradiation effect and comfortable for users to use.

The technical solution adopted to resolve the above technical problem provides a panel lamp, comprising a frame, a lamp panel, a light guide plate, reflective sheet, a lampshade and a rib supporting the lampshade. There is a clearance between the light guide plate and the lampshade.

In a preferred embodiment, the frame is provided with a strut member, and the strut member comprises a horizontal portion for supporting the lamp panel and a tilting portion for blocking light spots of the lamp panel.

In a preferred embodiment, the tilting portion contacts the light guide plate.

In a preferred embodiment, the width of part of the titling portion proximal to the light guide plate is larger than the width of the part far away from the light guide plate.

In a preferred embodiment, the tilting angle of the tilting portion is 20-60°.

In a preferred embodiment, the length of the horizontal portion of the strut member (5) is more than the thickness of the lamp panel, but equal to or less than the length of the rib.

In a preferred embodiment, the rib is 2.5-4 mm long.

In a preferred embodiment, two sides of one end of the titling portion proximal to the light guide plate are both in arc surfaces.

In a preferred embodiment, the rib and the strut member are both integrally molded with the frame.

In a preferred embodiment, there is a clamping slot on the lampshade whereby the rib is embedded to lock the lampshade. A limit slot is also arranged between the lampshade and the frame. The strut member also comprises a vertical portion joined to the horizontal portion and embedded in the limit slot to lock the strut member.

By adopting the abovementioned structure, as compared to the prior art, the present invention has the following advantages: there is a clearance between the light guide plate and the lampshade, so that light leaked from the space between the light source on the lamp panel and the light guide plate first passes through the clearance and then partially diffuses, therefore, light irradiated out from the lampshade becomes less so that the rib can be made narrower, thereby achieving a good irradiation effect and bringing comfort user experience to users by means of a narrow frame.

A strut member comprising two portions is arranged, that is, a horizontal portion for supporting and a titling portion for light shielding, therefore, light leaked from the space between the lamp panel and the light guide plate is shielded by the titling portion, light leakage hardly happens even never happens. In such a case, there is no need to lengthen the rib to shield light, that is to say, the rib may be made shorter only for supporting the lampshade, producing a good irradiation effect and bringing comfortable use experience to users.

Abutting the titling portion against the light guide plate has the effect of completely shielding the light leaked from the space between the lamp panel and the light guide plate. In addition, the titling portion of the strut member also plays a role in supporting the light guide plate so as to omit other structures for supporting the light guide plate.

The width of part of the titling portion proximal to the light guide plate is larger than the width of the part far away from the light guide plate, therefore, it can support the light guide plate well, and is high in reliability.

By setting the titling angle of 20-60°, a good light shielding effect is achieved under different lamp panel situations.

The length of the horizontal portion of the strut member is more than the thickness of the lamp panel, but equal to or less than the length of the rib, therefore, the rib may be made narrower, and the lampshade is convenient to install and fix.

The rib is 2.5-4 mm long, in such a case, the rib becomes narrower, and users are comfortable to use.

Two sides of one end of the titling portion proximal to the light guide plate are both in arc surfaces, therefore, a user is prevented from being scratched in installation, so safety hazard is low.

The rib and the strut member are both integrally molded with the frame, which will produce high installation efficiency and high reliability of a whole structure.

The strut member and the frame are separately arranged, so when the strut member is damaged, merely the strut member needs to be replaced rather than the whole frame, thus maintenance cost is low.

Figure 1:
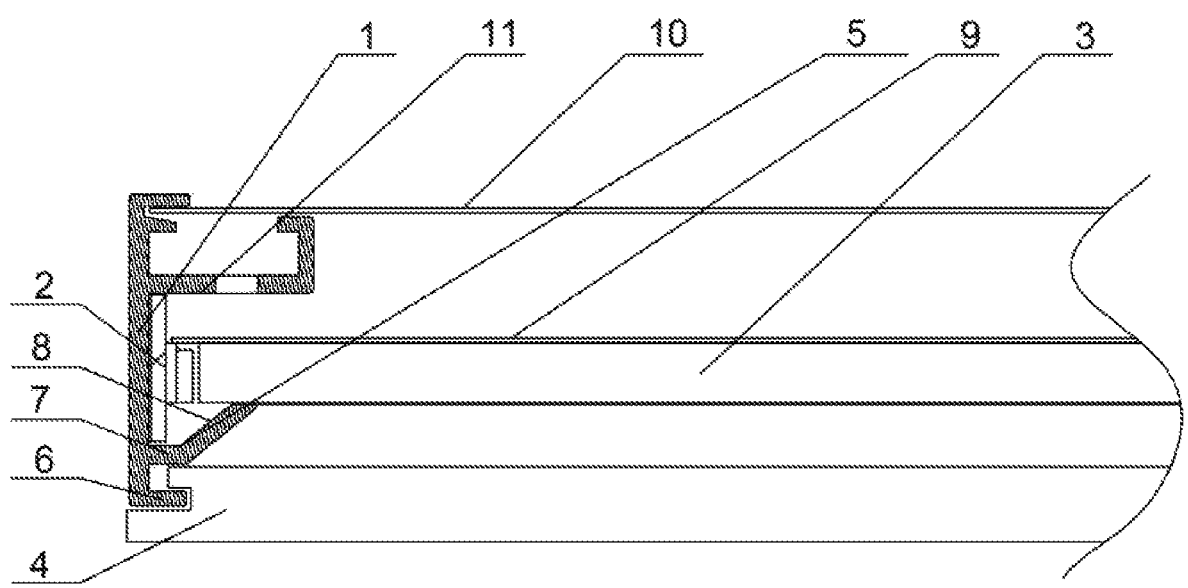
FIG. 1 is a partial sectional view of Embodiment One of a panel lamp of the present invention.

The reference numerals denote that: 1 frame; 2 lamp panel; 3 light guide plate; 4 lampshade; 5 strut member; 6 rib; 7 horizontal portion; 8 titling portion; 9 reflective sheet; 10 back panel; 11 support plate; 12 vertical portion.

DETAILED DESCRIPTION OF THE EMBODIMENTS

The present invention will be described in detail hereinafter by referring to the following embodiments, but not limited thereto.

In Embodiment One, as shown in FIG. 1, a panel lamp comprises a frame 1, a lamp panel 2, a light guide plate 3, a lampshade 4, reflective sheet 9, a back panel 10 and a rib 6 for supporting the lampshade 4, and the lamp panel 2 consists of a circuit board and a light emitting component, and the light emitting component and the light guide plate 3 are oppositely arranged so that light rays emitted from the light emitting component irradiate into the light guide plate 3; the light guide plate 3 is used for light rays emitted from the light emitting component to enter into; the reflective sheet 9 is arranged behind the light guide plate 3 and is larger than the light guide plate 3 in dimension so as to reflect out all the light rays entering in the light guide plate 3; the back panel 10 is arranged at the back of the panel lamp; the lampshade 4 is arranged in front of the panel lamp; and the lamp panel 2, the light guide plate 3, the reflective sheet 9, the back panel 10 and the lampshade 4 are conventional structures in the prior art, therefor, they are not further explained in this embodiment.

The frame 1 is integrally molded with a support plate 11, a strut member 5 and a rib 6, and the lamp panel 2 is accommodated between the strut member 5 and the support plate 11, that is, one end of the lamp panel 2 contacts and abuts against the strut member 5, while the other end of the lamp panel 2 contacts and abuts against the support plate 11. The strut member 5 comprises a horizontal portion 7 and a titling portion 8, the horizontal portion 7 is horizontally arranged on one end of the frame 1 for supporting the lamp panel 2, and the titling portion 8 titles at an angle of 20-60° and contacts and abuts against the light guide plate 3 to support the light guide plate 3; therefore, light emitted from the light emitting component of the lamp panel 2 is totally shielded by the strut member 5 instead of being leaked from the underside of the lamp panel 2, then has to enter into the light guide plate 3 and is reflected out by the reflective sheet 9. Further, in this embodiment, as the portion, contacting the tilting portion 8, of the light guide plate 3 is at the leftmost side of the light guide plate 3, not only are the roles in shielding light and supporting given into a full play, but also the size can be made smaller to avoid influencing light-emitting effect as far as possible. Due to the strut member 5, the light guide plate 3 and the lampshade 4 can be separated from each other. One end of the titling portion 8 of the strut member 5, proximal to the light guide plate 3, that is, two sides of the upper end of the titling portion 8 in FIG. 1 are both in arc surfaces.

A first clamping slot is arranged between the strut member 5 and a baffle, the lampshade 4 is mounted within the first clamping slot but does not completely stretch into the first clamping slot, that is, the lampshade does not contact the bottom of the first clamping slot; the lampshade 4 is also provided with a second clamping slot into which the baffle is embedded; the rib 6 is as long as the horizontal portion 7 of the strut member 5, preferably it is 2.5-4 mm long.

A portion of the support plate 11 further extends to support the back panel 10.

The panel lamp in the present application operates pursuant to the following work principle: the light emitting component of the lamp panel 2 on the frame 1 emits light rays, a small portion of light rays is leaked from the space between the lamp panel 2 and the light guide plate 3 but shielded by the strut member 5, so that no light is leaked from the lampshade 4. Even if a little light is leaked from the light guide plate 3 or light spots are generated, due to a certain clearance or distance between the light guide plate 3 and the lampshade 4, it/they will be scattered, at a result, a majority of light irradiates into the light guide plate 3 and then is reflected to one side of the lampshade 4 by the reflective sheet 9 behind the light guide plate 3, and finally uniform light rays are given off from the lampshade 4.

Figure 2:
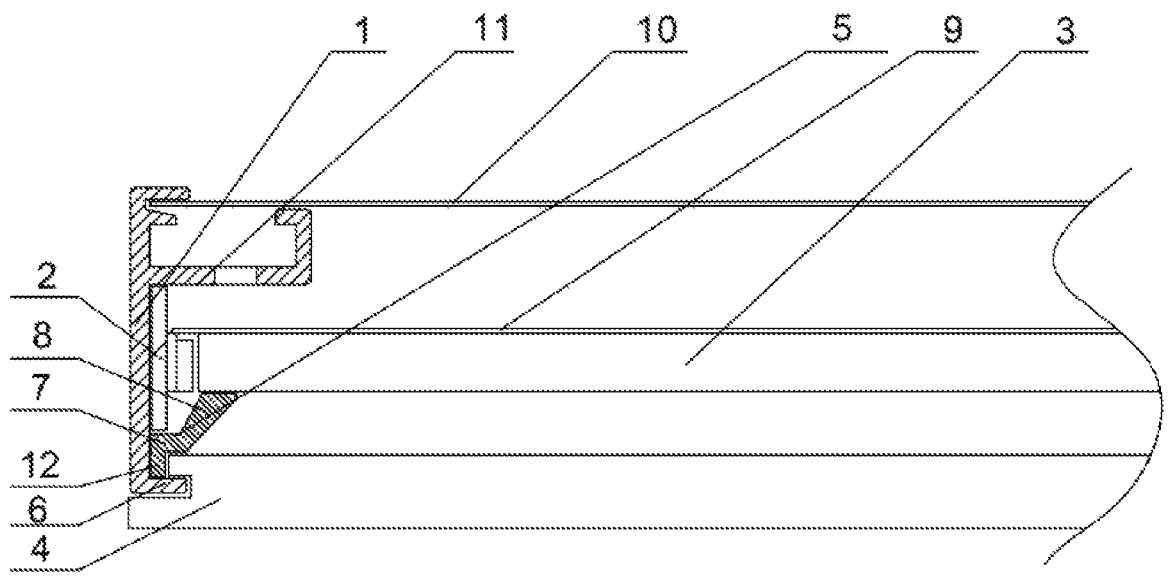
FIG. 2 is a partial sectional view of Embodiment Two of the panel lamp of the present invention.

In Embodiment Two, as shown in FIG. 2, it differs from Embodiment One in that the support plate 11 and the rib 6 are integrally molded with the frame 1, but the strut member 5 and the frame 1 are two different components and thus are not integrally molded. A first limit slot is formed in the lampshade 4, and the rib 6 is embedded in the first limit slot to be fixed, therefore, the lampshade 4 may be secured on the rib 6. The upper end of the first limit slot of the lampshade 4 is provided with a lug, and a second limit slot is arranged between the lug and the frame 1. The strut member 5 comprises a vertical portion 12, a horizontal portion 7 and a tilting portion 8 in sequence from the bottom up. The vertical portion 12 of the strut member 5 is embedded in the second limit slot to be limited left and right, the lower end of the vertical portion 12 of the strut member 5 abuts against the rib 6, the upper end of the horizontal portion 7 abuts against the lamp panel 2, in such arrangement, the strut member 5 is equivalent to be vertically limited, i.e., the strut member 5 is wholly limited and fixed. The upper end of the tilting portion 8 of the strut member 5 is wider than the lower end thereof, therefore, its contact area with the light guide plate 3 becomes larger, playing a good role in supporting the light guide plate 3.

It should be noted that, the above embodiments are merely illustrative, rather than restrictive, to the technical solutions of the present invention. Although the present invention has been explained in detail by referring to the abovementioned embodiments, it should be understood by those skilled in the art that, modifications to the technical solutions in the embodiments or equivalent substitutions of portion of technical features are allowed. These modifications or substitutions shall not cause the corresponding technical solutions to depart from the spirit and scope of the technical solutions of the embodiments of the present invention.

We claim:

1. A panel lamp, comprising a frame (1), a lamp panel (2), a light guide plate (3), a reflective sheet (9), a lampshade (4) and a rib (6) supporting the lampshade (4) wherein there is a clearance between the light guide plate (3) and the lampshade (4);

wherein the frame (1) is provided with a strut member (5), and the strut member (5) comprises a horizontal portion (7) for supporting the lamp panel (2) and a tilting portion (8) for blocking light spots of the lamp panel.

2. The panel lamp of claim 1, wherein the tilting portion (8) contacts the light guide plate (3).

3. The panel lamp of claim 2, wherein width of part of the titling portion (8) proximal to the light guide plate (3) is larger than width of part far away from the light guide plate (3).

4. The panel lamp of claim 1, wherein tilting angle of the tilting portion is 20-60°.

5. The panel lamp of claim 1, wherein length of the horizontal portion of the strut member (5) is more than thickness of the lamp panel (2), and the length of the horizontal portion (7) of the strut member (5) is equal to or less than the length of the rib (6).

6. The panel lamp of claim 1, wherein the rib is 2.5-4 mm long.

7. The panel lamp of claim 1, wherein two sides of one end of the titling portion (8) proximal to the light guide plate (3) are both in arc surfaces.

8. The panel lamp of claim 1, wherein the rib (6) and the strut member (5) are both integrally molded with the frame (1).

9. The panel lamp of claim 1, wherein there is a clamping slot on the lampshade (4) where the rib (6) is embedded to lock the lampshade (4), and a limit slot is also arranged between the lampshade (4) and the frame (1); the strut member (5) further comprises a vertical portion (12), the vertical portion (12) is connected with the horizontal portion (7) and the vertical portion (12) is embedded in the limit slot to lock the strut member (5).

\* \* \* \* \*